United States Patent
Van Lieu et al.

(10) Patent No.: US 12,234,733 B1
(45) Date of Patent: Feb. 25, 2025

(54) SEAL FLOW BYPASS

(71) Applicant: RTX Corporation, Farmington, CT (US)

(72) Inventors: Pieter Van Lieu, Cheshire, CT (US); Calvin Jay Winder, Cromwell, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/388,617

(22) Filed: Nov. 10, 2023

(51) Int. Cl.
| | |
|---|---|
| F01D 11/00 | (2006.01) |
| F01D 5/06 | (2006.01) |
| F16J 1/00 | (2006.01) |
| F16J 15/00 | (2006.01) |

(52) U.S. Cl.
CPC ............ *F01D 11/005* (2013.01); *F01D 5/066* (2013.01); *F16J 1/00* (2013.01); *F16J 15/00* (2013.01); *F05D 2220/3219* (2013.01); *F05D 2240/58* (2013.01)

(58) Field of Classification Search
CPC .................. F01D 11/005; F01D 5/066; F05D 2220/3219; F05D 2240/58; F16J 1/00; F16J 15/00
See application file for complete search history.

(56) References Cited

U.S. PATENT DOCUMENTS

| | | | |
|---|---|---|---|
| 4,750,746 A * | 6/1988 | Boudot | F16J 15/184 |
| | | | 415/230 |
| 5,344,162 A * | 9/1994 | Kernon | F16J 15/164 |
| | | | 277/579 |
| 10,851,893 B2 * | 12/2020 | Coleman | F16J 9/12 |
| 11,028,713 B2 | 6/2021 | Webb | |
| 2007/0189890 A1 * | 8/2007 | Snowsill | F01D 5/085 |
| | | | 415/115 |
| 2012/0112415 A1 * | 5/2012 | Benjamin | F16J 15/3272 |
| | | | 277/303 |
| 2014/0248122 A1 * | 9/2014 | Vetters | F01D 5/082 |
| | | | 415/122.1 |
| 2022/0259975 A1 | 8/2022 | Heyerman | |
| 2023/0323950 A1 | 10/2023 | Sullivan et al. | |

* cited by examiner

*Primary Examiner* — Courtney D Heinle
*Assistant Examiner* — Andrew J Marien
(74) *Attorney, Agent, or Firm* — CANTOR COLBURN LLP

(57) ABSTRACT

A gas turbine engine is provided and includes a first rotor element defining a groove, a second rotor element disposed to rotate about the first rotor element and a piston seal ring (PSR) disposed in the groove to form a seal between the first rotor element and the second rotor element. The second rotor element is formed to define bypass flow channels about the PSR that extend between opposite axial sides of the PSR.

14 Claims, 6 Drawing Sheets

SEAL FLOW BYPASS

BACKGROUND

Exemplary embodiments of the present disclosure relate generally to gas turbine engines and, in one embodiment, to a gas turbine engine with a non-speed differential seal flow bypass.

In a gas turbine engine, piston seal rings (PSR) are designed to maintain sealing contact between two solid bodies and operate by restricting flows of fluid, gas or air. A PSR can be used in static or rotating applications and usually is housed within a groove where the PSR has both axial and radial contact with adjacent hardware. These solid axial and radial contacts provide restriction to avoid mixing of fluid, gas or air from one compartment of the gas turbine engine to another. PSRs can be found throughout jet engines and in some locations their seal is essential in order to maintain engine performance and part durability.

Accordingly, a continued need exists for improved PSRs for use in gas turbine engines, in particular.

BRIEF DESCRIPTION

According to an aspect of the disclosure, a gas turbine engine is provided and includes a first rotor element defining a groove, a second rotor element disposed to rotate about the first rotor element and a piston seal ring (PSR) disposed in the groove to form a seal between the first rotor element and the second rotor element. The second rotor element is formed to define bypass flow channels about the PSR that extend between opposite axial sides of the PSR.

In accordance with additional or alternative embodiments, the first rotor element includes at least a tie shaft and the second rotor element includes at least a rotor bore.

In accordance with additional or alternative embodiments, the PSR includes opposite ends, a joint at which the opposite ends register with each other and entirely smooth and continuous axial and radial surfaces extending between the opposite ends.

In accordance with additional or alternative embodiments, the bypass flow channels are distributed evenly about the PSR.

In accordance with additional or alternative embodiments, the bypass flow channels begin at a first plenum at an upstream side of the PSR and terminate at a second plenum at a downstream side of the PSR.

In accordance with additional or alternative embodiments, the second rotor element includes an interior facing surface and the second rotor element is formed to define each of the bypass flow channels as a slot extending along the interior facing surface.

In accordance with additional or alternative embodiments, the second rotor element includes a body and the second rotor element is formed to define each of the bypass flow channels as a through-hole extending through the body.

In accordance with additional or alternative embodiments, the bypass flow channels are angled in correspondence with a direction of rotation of the second rotor element.

In accordance with additional or alternative embodiments, the bypass flow channels are angled in opposition to a direction of rotation of the second rotor element.

According to an aspect of the disclosure, a gas turbine engine is provided and includes a first rotor element defining a groove, a second rotor element disposed to rotate about the first rotor element and a piston seal ring (PSR) disposed in the groove to form a seal between the first rotor element and the second rotor element. The second rotor element is formed to define bypass flow channels about the PSR that extend between opposite axial sides of the PSR such that the bypass flow channels form a symmetric leak path across the PSR.

In accordance with additional or alternative embodiments, the first rotor element includes at least a tie shaft and the second rotor element includes at least a rotor bore.

In accordance with additional or alternative embodiments, the PSR includes opposite ends, a joint at which the opposite ends register with each other and entirely smooth and continuous axial and radial surfaces extending between the opposite ends.

In accordance with additional or alternative embodiments, the bypass flow channels are distributed evenly about the PSR.

In accordance with additional or alternative embodiments, the bypass flow channels begin at a first plenum at an upstream side of the PSR and terminate at a second plenum at a downstream side of the PSR.

In accordance with additional or alternative embodiments, the second rotor element includes an interior facing surface and the second rotor element is formed to define each of the bypass flow channels as a slot extending along the interior facing surface.

In accordance with additional or alternative embodiments, the second rotor element includes a body and the second rotor element is formed to define each of the bypass flow channels as a through-hole extending through the body.

In accordance with additional or alternative embodiments, the bypass flow channels are angled in correspondence with a direction of rotation of the second rotor element.

In accordance with additional or alternative embodiments, the bypass flow channels are angled in opposition to a direction of rotation of the second rotor element.

According to an aspect of the disclosure, a gas turbine engine is provided and includes a first rotor element defining a groove, a second rotor element disposed to rotate about the first rotor element and a piston seal ring (PSR) disposed in the groove to form a seal between the first rotor element and the second rotor element. The second rotor element is formed to define first bypass flow channels about the PSR that extend between opposite axial sides of the PSR and the first rotor element is formed to define second bypass flow channels along an interior surface of the PSR that extend between the opposite axial sides of the PSR.

In accordance with additional or alternative embodiments, the first and second bypass flow channels form first and second symmetric leak paths across the PSR.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
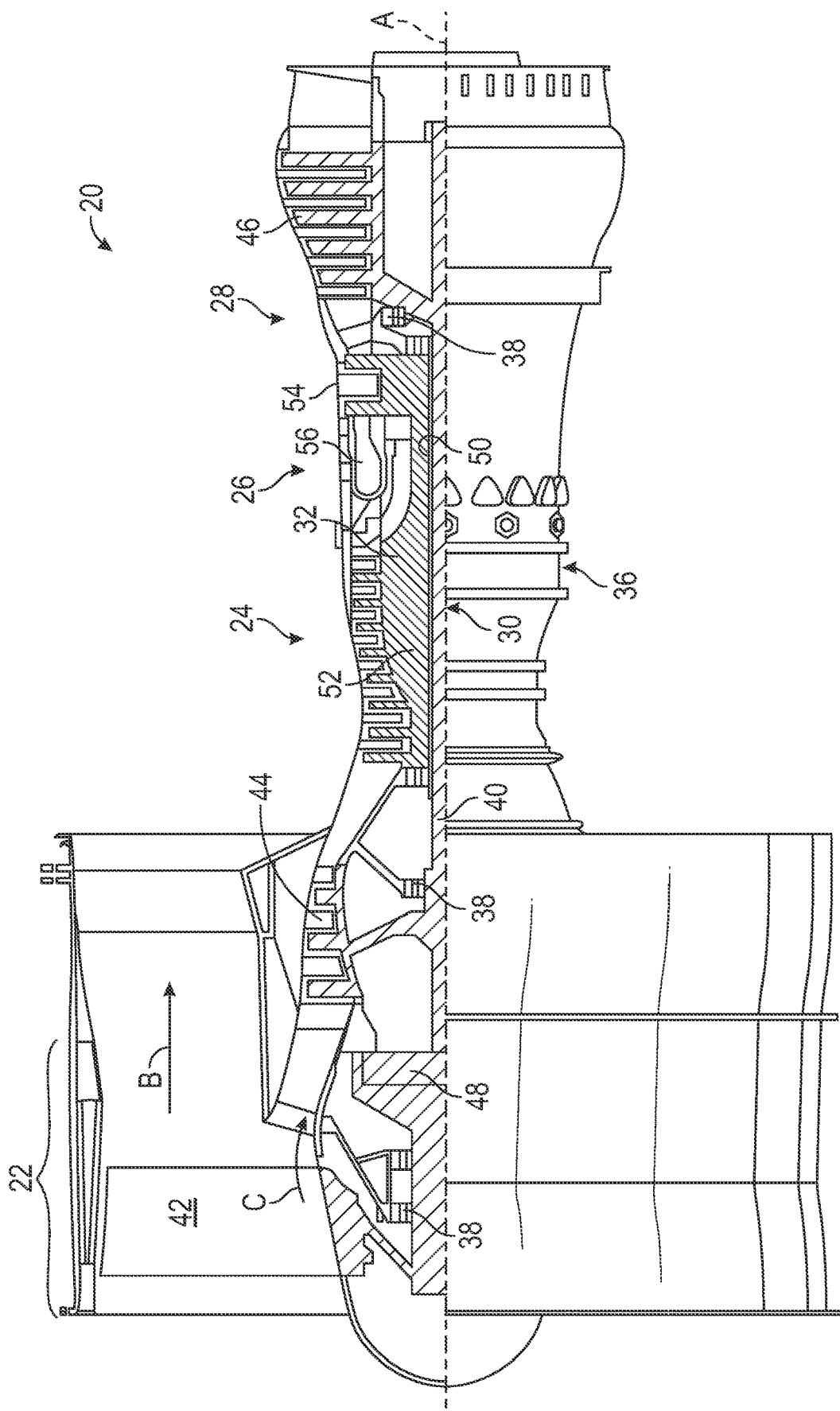
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

Figure 2:
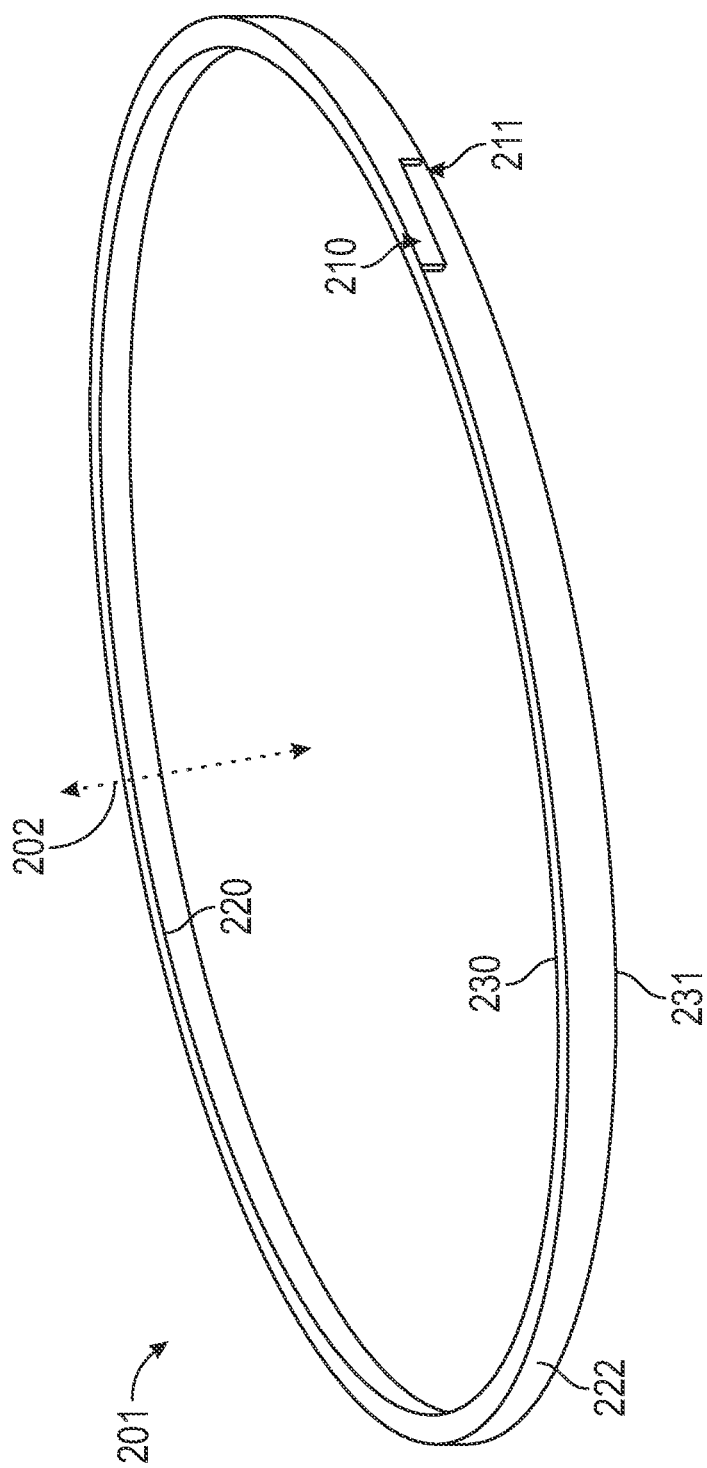
FIG. 2 is a perspective view of piston seal ring in accordance with embodiments.
Figure 3:
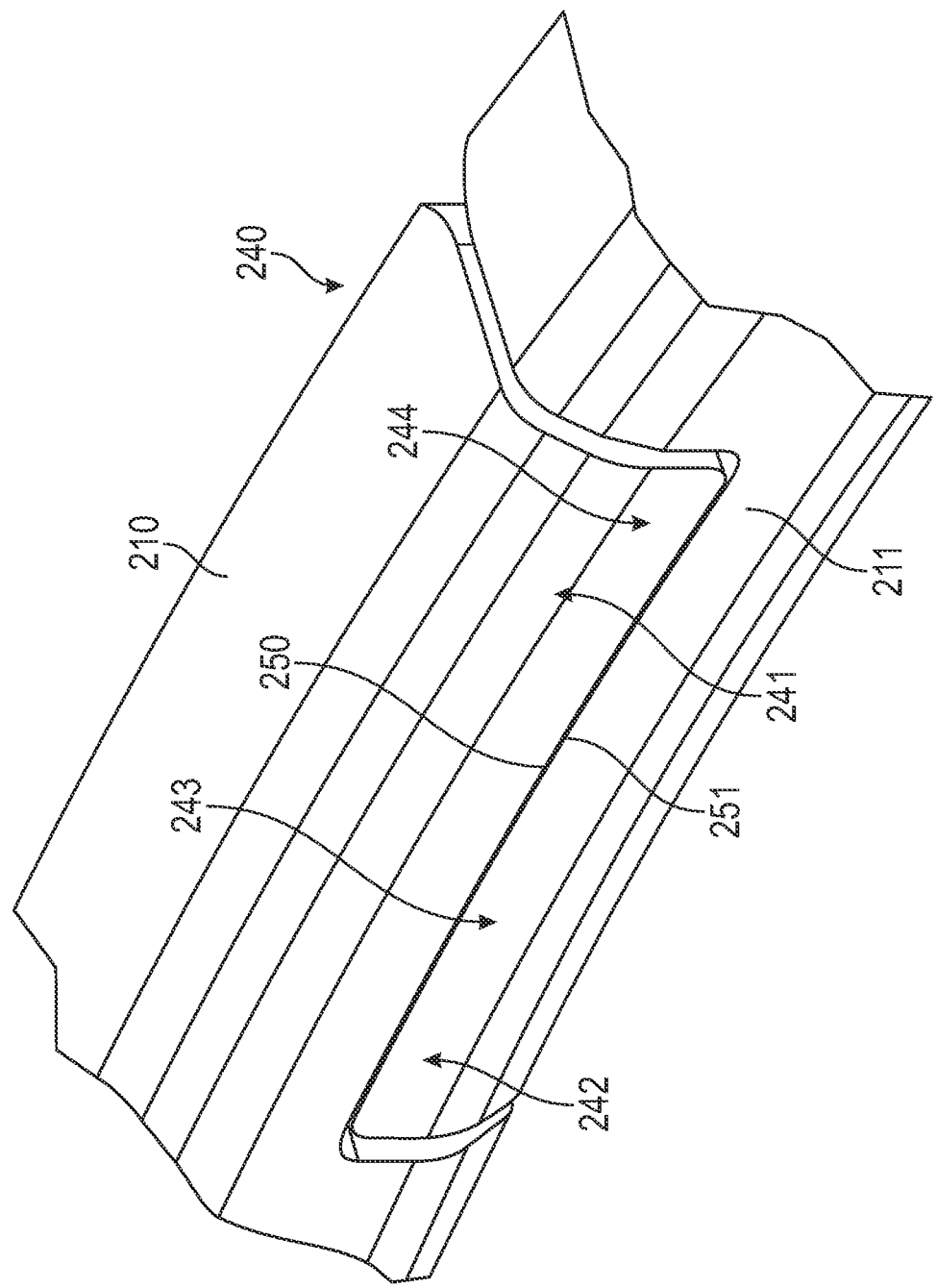
FIG. 3 is an enlarged cutaway perspective view of a portion of the piston seal ring of FIG. 2 in accordance with embodiments.

With reference to FIGS. 2 and 3, a piston seal ring (PSR) 201 is provided for use in the gas turbine engine 20 of FIG. 1 in at least the compressor section 24. The PSR 201 can be formed as a split ring seal having a first circumferential end 210, a second circumferential end 211, an interior facing inner diameter (ID) surface 220, an exterior facing outer diameter (OD) surface 222, a first axial end face 230 and a second axial end face 231. The PSR 201 has a nominal central longitudinal axis (centerline) 202 that is shared with the members it seals when in a nominally centered condition. The first circumferential end 210 and the second circumferential end 211 form a joint or junction 240 (see FIG. 3). The joint or junction 240 can be provided as a shiplap joint with a projecting portion 241 of the first circumferential end 210 being received by a rebate 242 of the second circumferential end 211 and a projecting portion 243 of the second circumferential 211 end being received by a rebate 244 in the first circumferential end 210. The example projecting portions have mating faces/surfaces 250 and 251 which, in the example, closely face or contact along a transverse radial centerplane.

PSRs, such as the PSR 201 of FIGS. 2 and 3, are often small in cross section and made of relatively soft material as compared to the surrounding hardware. In addition, PSRs are typically split for assembly purposes (i.e., the joint or junction 240 of FIGS. 2 and 3) and therefore may have little or limited hoop strength. As such, the overlap at the split of the PSRs as well as manufacturing processes and operational loading and wear can cause the sealing surfaces of PSRs to have flatness and/or circularity errors that allow for local leakage. Often this leakage is non-axisymmetric. Such non-axisymmetric leakage leads to local thermal hotspots on the surrounding hardware that can, in turn, lead to non-axisymmetric distortion of the surrounding hardware resulting in mass unbalance, localized stress concentrations and reduced sealing performance.

Therefore, as will be described below, bypass flows are implemented evenly around the hardware surrounding the PSR. The bypass flows essentially trade some of the sealing effectiveness of the PSR for uniform thermal behavior. Moreover, the usage of the bypass flows in this manner avoids any need to form bypass slots or channels in the PSR, which is itself already thin, and allows for reduced structural risk in the PSR. The bypass flows can be formed as channels or slots in the surrounding hardware, such as the rotor bore and the tie shaft.

Figure 4:
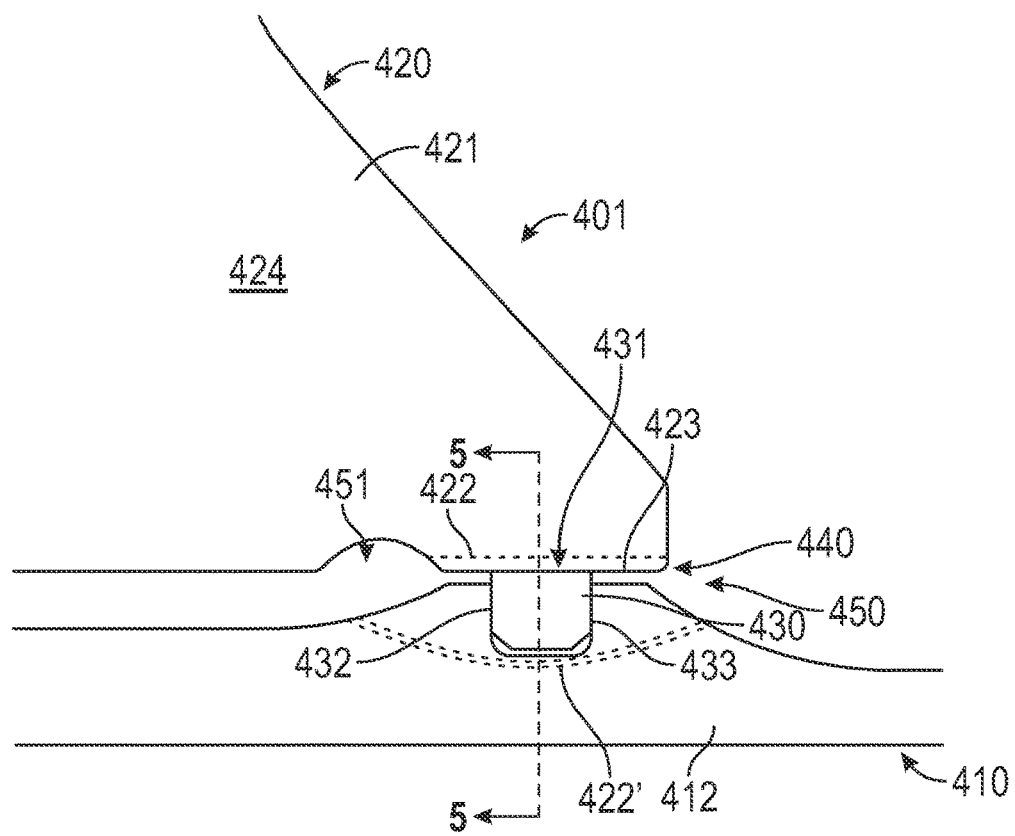
FIG. 4 is a side schematic illustration of first and second rotor elements, a piston seal ring and bypass flow channels formed along an interior surface of the second rotor element in accordance with embodiments.
Figure 5:
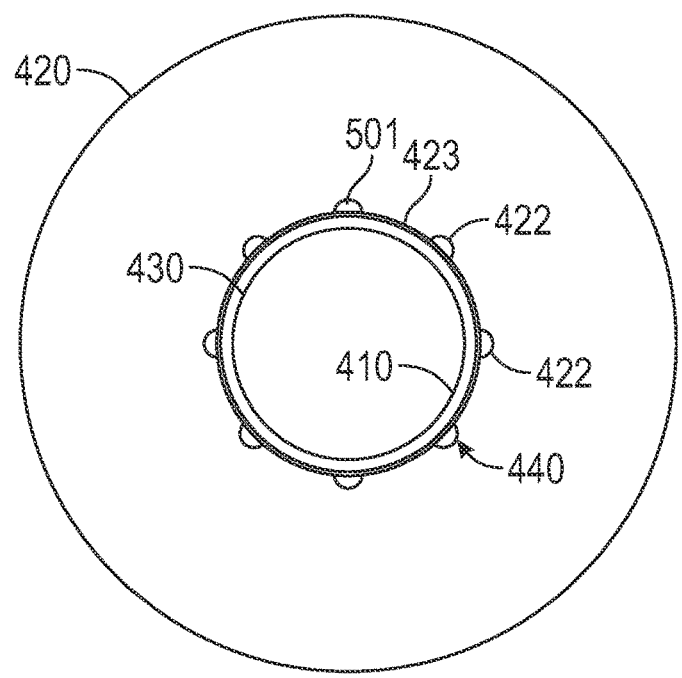
FIG. 5 is a cross-sectional view of first and second rotor elements, a piston seal ring and bypass flow channels formed along the interior surface of the second rotor element taken along line 5-5 of FIG. 4 in accordance with embodiments.

With reference to FIGS. 4 and 5, section 401 of a gas turbine engine, such as the compression section 24 of the gas turbine engine 20 of FIG. 1, includes a first rotor element 410 defining a continuous circumferential groove 411, a second rotor element 420 that is disposed to rotate about the first rotor element 410 and a PSR 430. The first rotor element 410 can be provided at least as a tie shaft 412 or another similar feature and the second rotor element 420 can be provided at least as a rotor bore 421 or another similar feature. As described above and as shown in FIGS. 2 and 3, the PSR 430 includes opposite ends (i.e., first circumferential end 210 and second circumferential end 211 of FIG. 2), a joint at which the opposite ends register with each other (i.e., the joint or junction 240 of FIGS. 2 and 3) and entirely smooth and continuous axial and radial surfaces extending between the opposite ends (i.e., ID surface 220, OD surface 222, first axial end face 230 and second axial end face 231 of FIG. 2).

The PSR 430 is disposed in the continuous circumferential groove 411 to form a continuous circumferential seal 431 between the first rotor element 410 and the second rotor element 420. The second rotor element 420 is formed to define bypass flow channels 422 about the PSR 430 that extend between opposite axial sides 432, 433 of the PSR 430. In accordance with embodiments, the second rotor element 420 is formed to define the bypass flow channels 422 such that the bypass flow channels 422 form a symmetric leak path 440 across the PSR 430.

In some but not all cases, the bypass flow channels 422 defined by the second rotor element 420 can be provided as first bypass flow channels whereas the first rotor element 410 can also be formed to define bypass flow channels 422' as second bypass flow channels. These bypass flow channels 422' would thus extend along an interior surface of the PSR 430 and as above would extend between the opposite axial sides 432, 433 of the PSR 430 to contribute to the formation of the symmetric leak path 440 (i.e., to form first and second symmetric leak paths).

As shown in FIG. 4, the bypass flow channels 422 can be configured such that they begin at a first plenum 450 at an upstream side of the PSR 430 and terminate at a second plenum 451 at a downstream side of the PSR 430.

As shown in FIG. 5, the bypass flow channels 422 are distributed substantially evenly about the PSR 430. In this way, while leakage across the PSR 430 can be non-axisymmetric, the bypass flow channels 422 form the symmetric leak path 440 which is axi-symmetric. Moreover, the volume of the fluid moving through the bypass flow channels 422 can significantly exceed and effectively overwhelm the volume of non-axisymmetric leakage across the PSR 430. As a result, thermal responses of the hardware surrounding the PSR (i.e., the first rotor element 420 and the second rotor element 420) can be controlled in an axi-symmetric manner.

In accordance with further embodiments and as shown in FIGS. 4 and 5, the second rotor element 420 can include an interior facing surface 423. In these or other cases, the interior surface 423 of the second rotor element 420 can be formed to define each of the bypass flow channels 422 as a slot 501 (see FIG. 5) that extends along the interior facing surface 423 in an axial dimension and/or in an axial and a circumferential dimension.

Figure 6:
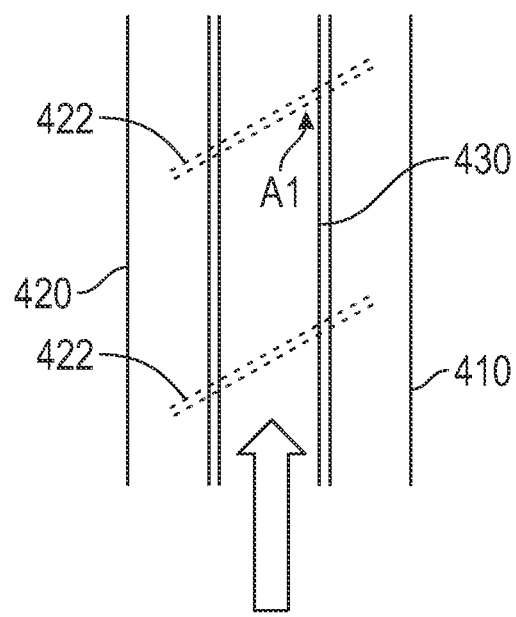
FIG. 6 is a schematic diagram illustrating an angling of the bypass flow channels of FIGS. 4 and 5 in correspondence with rotation of the second rotor element in accordance with embodiments.
Figure 7:
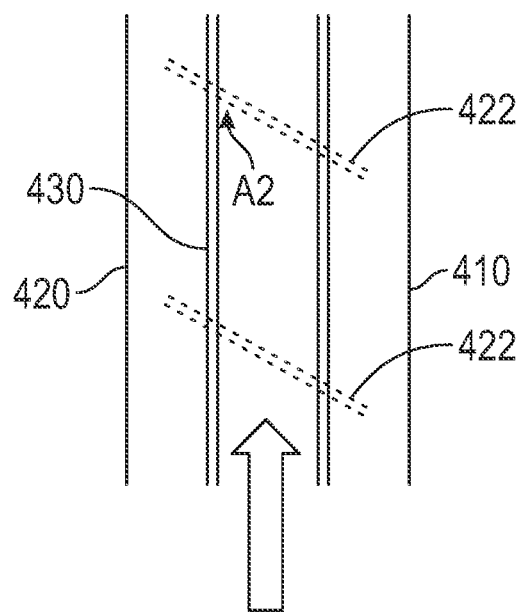
FIG. 7 is a schematic diagram illustrating an angling of the bypass flow channels of FIGS. 4 and 5 in opposition to rotation of the second rotor element in accordance with embodiments.

With reference to FIGS. 6 and 7, the bypass flow channels 422 can be angled. As shown in FIG. 6, the bypass flow channels 422 can be angled at angle A1 in correspondence with a direction of rotation of the second rotor element 420 to encourage and entrain flow through the bypass flow channels. As shown in FIG. 7, the bypass flow channels 422 can be angled at angle A2 in opposition to the direction of rotation of the second rotor element 420. In accordance with embodiments, the angle A1 can be between 0° and 70° or, more narrowly, between 20° and 35° and the angle A2 can be between 0° and 70° or, more narrowly, between 20° and 35° (the angles A1 and A2 in FIGS. 6 and 7 are not drawn to scale).

Figure 8:
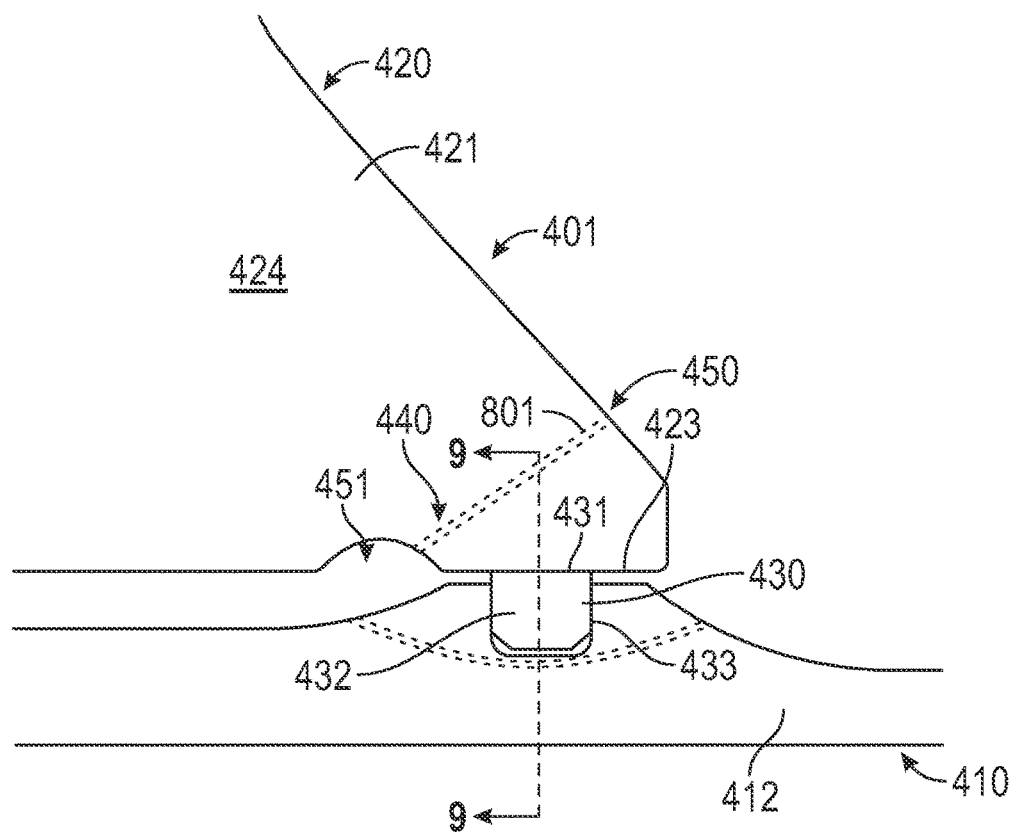
FIG. 8 is a side schematic illustration of first and second rotor elements, a piston seal ring and bypass flow channels formed through a body of the second rotor element in accordance with embodiments.
Figure 9:
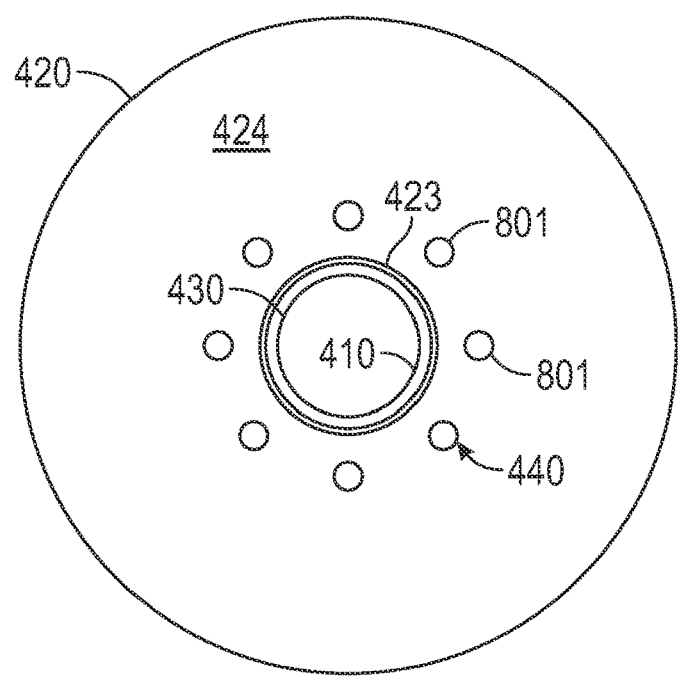
FIG. 9 is a cross-sectional view of first and second rotor elements, a piston seal ring and bypass flow channels formed through the body of the second rotor element taken along line 9-9 of FIG. 8 in accordance with embodiments.

With reference to FIGS. 8 and 9 and in accordance with further alternative embodiments, the second rotor element 420 can include a body 424. In these or other cases, the body 424 of the second rotor element 420 can be formed to define each of the bypass flow channels (i.e., each of the bypass flow channels 422 of FIG. 4) as a through-hole 801 that extends through the body 424. The through-holes as bypass flow channels of the embodiments of FIGS. 8 and 9 are other otherwise configured similarly as described above and need not be re-described.

Benefits of the features described herein are the utilization of parts adjacent to a PSR to form bypass flows that essentially trade some of the sealing effectiveness of the PSR for uniform thermal behavior. The bypass flows reduce manufacturability difficulties and allow for reduced structural risk to the PSR by not having bypass slots or channels formed therein.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine, comprising:
a first rotor element defining a groove;
a second rotor element disposed to rotate about the first rotor element; and
a piston seal ring (PSR) disposed in the groove to form a seal between the first rotor element and the second rotor element,
the second rotor element being formed to define bypass flow channels about the PSR that extend between opposite axial sides of the PSR, wherein:
the bypass flow channels begin at a first plenum at an upstream side of the PSR,
the second rotor element comprises a body and an interior facing surface facing the first rotor element and forming a recess, which is recessed away from the first rotor element and into the body, as a second plenum at a downstream side of the PSR, and
the second rotor element is formed to define each of the bypass flow channels as a slot extending along the interior facing surface and terminating at the second plenum at the downstream side of the PSR.

2. The gas turbine engine according to claim 1, wherein the first rotor element comprises at least a tie shaft and the second rotor element comprises at least a rotor bore.

3. The gas turbine engine according to claim 1, wherein the PSR comprises:
opposite ends;
a joint at which the opposite ends register with each other; and
entirely smooth and continuous axial and radial surfaces extending between the opposite ends.

4. The gas turbine engine according to claim 1, wherein the bypass flow channels are distributed evenly about the PSR.

5. The gas turbine engine according to claim 1, wherein the bypass flow channels are angled in correspondence with a direction of rotation of the second rotor element.

6. The gas turbine engine according to claim 1, wherein the bypass flow channels are angled in opposition to a direction of rotation of the second rotor element.

7. A gas turbine engine, comprising:
a first rotor element defining a groove;
a second rotor element disposed to rotate about the first rotor element; and
a piston seal ring (PSR) disposed in the groove to form a seal between the first rotor element and the second rotor element,
the second rotor element being formed to define bypass flow channels about the PSR that extend between opposite axial sides of the PSR such that the bypass flow channels form a symmetric leak path across the PSR,
wherein:
the bypass flow channels begin at a first plenum at an upstream side of the PSR,
the second rotor element comprises a body and an interior facing surface facing the first rotor element and forming a recess, which is recessed away from the first rotor element and into the body, as a second plenum at a downstream side of the PSR, and
the second rotor element is formed to define each of the bypass flow channels as a through-hole extending through the body and terminating at the second plenum at the downstream side of the PSR.

8. The gas turbine engine according to claim 7, wherein the first rotor element comprises at least a tie shaft and the second rotor element comprises at least a rotor bore.

9. The gas turbine engine according to claim 7, wherein the PSR comprises:
opposite ends;
a joint at which the opposite ends register with each other; and
entirely smooth and continuous axial and radial surfaces extending between the opposite ends.

10. The gas turbine engine according to claim 7, wherein the bypass flow channels are distributed evenly about the PSR.

11. The gas turbine engine according to claim 7, wherein the bypass flow channels are angled in correspondence with a direction of rotation of the second rotor element.

12. The gas turbine engine according to claim 1, wherein the bypass flow channels are angled in opposition to a direction of rotation of the second rotor element.

13. A gas turbine engine, comprising:
a first rotor element defining a groove;
a second rotor element disposed to rotate about the first rotor element; and
a piston seal ring (PSR) disposed in the groove to form a seal between the first rotor element and the second rotor element,
the second rotor element being formed to define first bypass flow channels about the PSR that extend between opposite axial sides of the PSR and the first rotor element being formed to define second bypass flow channels along an interior surface of the PSR that extend between the opposite axial sides of the PSR,
wherein:
the bypass flow channels begin at a first plenum at an upstream side of the PSR,
the second rotor element comprises a body and an interior facing surface facing the first rotor element and forming a recess, which is recessed away from the first rotor element and into the body, as a second plenum at a downstream side of the PSR, and
the second rotor element is formed to define each of the bypass flow channels as one of a slot extending along the interior facing surface and terminating at the second plenum at the downstream side of the PSR and a through-hole extending through the body and terminating at the second plenum at the downstream side of the PSR.

14. The gas turbine engine according to claim 13, wherein the first and second bypass flow channels form first and second symmetric leak paths across the PSR.

\* \* \* \* \*